United States Patent
Aoki

(10) Patent No.: US 12,083,420 B2
(45) Date of Patent: Sep. 10, 2024

(54) VIBRATION CONTROL SYSTEM

(71) Applicant: NINTENDO CO., LTD., Kyoto (JP)

(72) Inventor: Takafumi Aoki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 197 days.

(21) Appl. No.: 17/681,043

(22) Filed: Feb. 25, 2022

(65) Prior Publication Data

US 2022/0274014 A1    Sep. 1, 2022

(30) Foreign Application Priority Data

Feb. 26, 2021    (JP) .................. 2021-029824

(51) Int. Cl.
A63F 13/285    (2014.01)
(52) U.S. Cl.
CPC .................. *A63F 13/285* (2014.09)
(58) Field of Classification Search
CPC ....... A63F 13/285; B06B 1/0253; B06B 1/16; B06B 1/161; H02P 23/0077; H02P 25/034; H02P 25/032
See application file for complete search history.

(56) References Cited

U.S. PATENT DOCUMENTS

| | | | |
|---|---|---|---|
| 7,161,580 B2 | 1/2007 | Bailey et al. | |
| 7,791,588 B2 | 9/2010 | Tierling et al. | |
| 8,569,571 B2 | 10/2013 | Kline et al. | |
| 8,638,301 B2 | 1/2014 | Birnbaum et al. | |
| 9,245,429 B2 | 1/2016 | Cruz-Hernandez et al. | |
| 9,454,881 B2 | 9/2016 | Cruz-Hernandez et al. | |
| 9,878,239 B2 | 1/2018 | Heubel et al. | |

(Continued)

FOREIGN PATENT DOCUMENTS

| | | |
|---|---|---|
| JP | 2002-27028 A | 1/2002 |
| JP | 2014-2729 A | 1/2014 |

(Continued)

OTHER PUBLICATIONS

Communication dated Jan. 10, 2023 in JP counterpart application (see global dossier).

(Continued)

*Primary Examiner* — Justin L Myhr
*Assistant Examiner* — Carl V Larsen
(74) *Attorney, Agent, or Firm* — Nixon & Vanderhye P.C.

(57) ABSTRACT

A vibration control system includes: a reception section configured to receive eccentric motor drive data that is included in a program for an application and is for causing vibration of an eccentric motor vibration device; a vibration device for which a resonance frequency is higher than that of the eccentric motor vibration device and whose amplitude and frequency are controllable; and a vibration data generation section configured to generate vibration data for causing vibration of the vibration device based on the received eccentric motor drive data. The vibration data generation section generates the vibration data, which indicates a second waveform having an envelope with a change trend that correlates to a change trend of an envelope of a first waveform indicated by vibration of the eccentric motor vibration device vibrated by the eccentric motor drive data, the second waveform having a higher frequency than the first waveform.

19 Claims, 15 Drawing Sheets

(56) References Cited

U.S. PATENT DOCUMENTS

| | | |
|---|---|---|
| 9,901,819 B2* | 2/2018 | Yamashita ............... A63F 13/92 |
| 10,589,169 B2* | 3/2020 | Komori .................. A63F 13/23 |
| 11,198,059 B2* | 12/2021 | Konishi .................. A63F 13/79 |
| 2002/0025838 A1 | 2/2002 | Kawamura |
| 2003/0067440 A1 | 4/2003 | Rank |
| 2005/0134561 A1 | 6/2005 | Tierling et al. |
| 2013/0335209 A1 | 12/2013 | Cruz-Hernandez et al. |
| 2014/0064516 A1* | 3/2014 | Cruz-Hernandez ..... G06F 3/016 381/98 |
| 2015/0070151 A1 | 3/2015 | Cruz-Hernandez et al. |
| 2015/0070261 A1 | 3/2015 | Saboune et al. |
| 2015/0070269 A1* | 3/2015 | Bhatia ..................... G06F 3/167 345/156 |
| 2015/0072789 A1 | 3/2015 | Heubel et al. |
| 2015/0131827 A1* | 5/2015 | Hawker ................. H04R 25/43 381/312 |
| 2015/0273322 A1* | 10/2015 | Nakagawa ............. A63F 13/285 463/37 |
| 2016/0080682 A1* | 3/2016 | Diaz ..................... A63F 13/285 386/227 |
| 2016/0246376 A1* | 8/2016 | Birnbaum ............. G06F 3/0488 |
| 2016/0258758 A1* | 9/2016 | Houston ................ G01D 5/145 |
| 2017/0354870 A1 | 12/2017 | Okamura |
| 2017/0354876 A1* | 12/2017 | Rihn ..................... G06F 3/0338 |
| 2018/0178118 A1 | 6/2018 | Kyuma |
| 2018/0178120 A1 | 6/2018 | Kyuma |
| 2018/0178121 A1 | 6/2018 | Yamashita et al. |
| 2018/0243647 A1* | 8/2018 | Komori ................ A63F 13/215 |
| 2019/0213851 A1* | 7/2019 | Rihn ....................... G06F 3/016 |
| 2019/0340899 A1 | 11/2019 | Rihn et al. |
| 2020/0211337 A1* | 7/2020 | Grant ..................... G08B 25/10 |
| 2020/0328711 A1* | 10/2020 | Mortazav ............... B06B 1/0246 |
| 2020/0356173 A1* | 11/2020 | Bajaj ....................... G06F 3/016 |
| 2020/0389730 A1* | 12/2020 | Hashimoto ............. H04R 3/00 |
| 2021/0052980 A1 | 2/2021 | Lindemann et al. |
| 2021/0121915 A1* | 4/2021 | Delson .................. H02K 7/061 |
| 2021/0135616 A1* | 5/2021 | Hernandez ......... G05B 19/4155 |
| 2021/0157408 A1* | 5/2021 | Karimi Eskandary . G06F 3/016 |
| 2022/0092952 A1* | 3/2022 | Nishigori ................. G08B 6/00 |
| 2022/0158655 A1* | 5/2022 | Matsumoto ......... H03M 7/3068 |
| 2023/0131395 A1* | 4/2023 | Nishigori ................ G06F 3/016 345/173 |

FOREIGN PATENT DOCUMENTS

| | | |
|---|---|---|
| JP | 2015-53038 A | 3/2015 |
| JP | 2015-56183 A | 3/2015 |
| JP | 2017-221631 A | 12/2017 |
| JP | 2018-102610 | 7/2018 |
| JP | 2018-523863 A | 8/2018 |
| JP | 2019-121399 A | 7/2019 |
| JP | 2019-153322 A | 9/2019 |
| JP | 2020-107320 A | 7/2020 |
| WO | 2016136934 A1 | 9/2016 |
| WO | 2017034973 A1 | 3/2017 |

OTHER PUBLICATIONS

Extended European Search Report issued on Jul. 29, 2022 in European Application No. 22158784.3, 8 pages.

* cited by examiner

Fig. 14
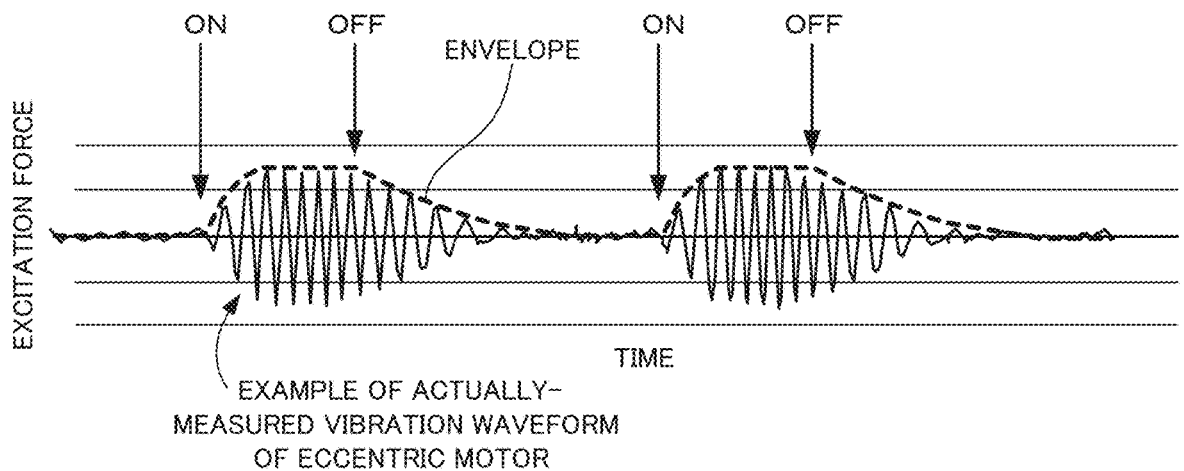
Fig. 15
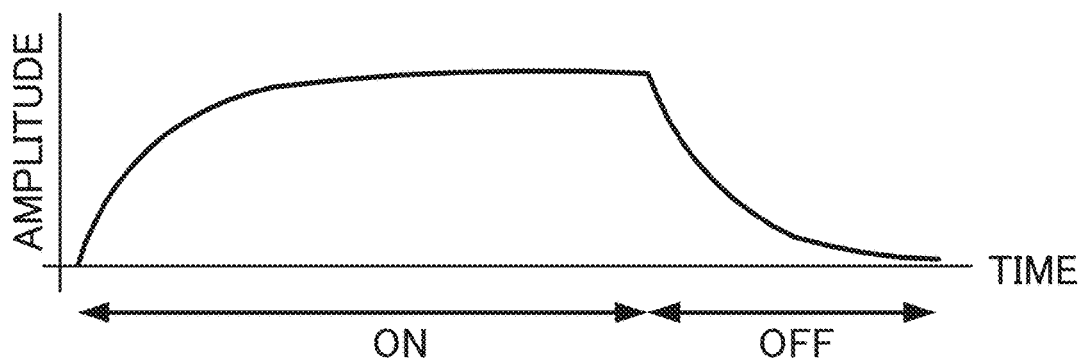
Fig. 16
```
if (isEnable)
    next = current * 0.93 + 1.0
else
    next = current * 0.93
```

```
if (isEnable)
  next = current * 0.93 + value
else
  next = current * 0.93
```

VIBRATION CONTROL SYSTEM

This application claims priority to Japanese Patent Application No. 2021-29824 filed on Feb. 26, 2021, the entire contents of which are incorporated herein by reference.

TECHNICAL FIELD

The present disclosure relates to a vibration control system, a vibration control method, and a vibration control program.

BACKGROUND ART

JP 2018-102610A discloses that when vibration devices of multiple different apparatuses are to be vibrated based on vibration data (analog data indicating a vibration waveform, a signal of the vibration waveform itself, a digitized vibration waveform, a set of a value indicating a frequency and a value indicating an amplitude, etc.) read from an application program, the vibration data is adjusted according to the characteristics of each apparatus.

SUMMARY

Incidentally, an apparatus including an eccentric motor as a vibrator is known. Due to its mechanism, the frequency and amplitude of the eccentric motor cannot be controlled individually, and the eccentric motor outputs vibration that is a set of a predetermined frequency and amplitude according to the rotation speed. For this reason, in controlling such an eccentric motor, the above-described vibration data is not suitable, and it is common that drive data (ON/OFF signals, drive voltage values (including designation of only strength/weakness), ON time, etc.) for the eccentric motor is read from the application program and the eccentric motor is controlled based on this. Thus, a program for an application that is supposed to be operated using an apparatus including an eccentric motor vibration device includes drive data of the eccentric motor when the vibration device is to be vibrated.

Here, if the above-described application is operated using an apparatus including a vibration device that vibrates based on vibration data, it is not possible to cause vibration with the drive data for the eccentric motor included in the application program in the first place. On the other hand, creating such vibration data separately from scratch can be a burden on an application creator.

The present disclosure was made to solve the above-described problem, and aims to provide a vibration control system, a vibration control method, and a vibration control program, according to which it is possible to control vibration of a vibration device by generating vibration data based on drive data for an eccentric motor without generating new vibration data from scratch.

The vibration control system according to the present disclosure includes: a reception section configured to receive eccentric motor drive data that is included in a program for an application and is for causing vibration of an eccentric motor vibration device; a vibration device for which a resonance frequency is higher than that of the eccentric motor vibration device and whose amplitude and frequency are controllable; and a vibration data generation section configured to generate vibration data for causing vibration of the vibration device based on the received eccentric motor drive data, in which the vibration data generation section is configured to generate the vibration data, which indicates a second waveform having an envelope with a change trend that correlates to a change trend of an envelope of a first waveform indicated by vibration of the eccentric motor vibration device vibrated according to the eccentric motor drive data, the second waveform having a higher frequency than the first waveform.

Since the structure of the vibration device disclosed by the present disclosure is different from that of a vibration device of an eccentric motor type, in the case of reproducing the vibration of the eccentric motor with this vibration device, according to the inventor of the present disclosure, it was found that a feeling closer to the vibration of an eccentric motor can be obtained when, instead of the vibration waveform of an eccentric motor, the envelope of that vibration waveform (first waveform) is reproduced using the envelope of the vibration waveform (second waveform) of the vibration device. In view of this, in the present disclosure, a configuration is used in which vibration data indicating a second waveform with an envelope with a change trend that correlates to a change trend of an envelope of a first waveform indicated by the vibration of the eccentric motor vibration device vibrated using the eccentric motor drive data is generated, the frequency of the second waveform being higher than that of the first waveform. In this manner, the vibration data can be generated based on the drive data for vibrating the eccentric motor vibration device, and therefore it is not necessary to separately create the vibration data, and as a result, the burden on the application creator can be reduced.

In the above-described vibration control system, it is possible to use a configuration in which the vibration data generation unit is configured to calculate an amplitude at a time t based on the eccentric motor drive data, normalizes the calculated amplitude to a numeric value in a predetermined range, and generates the vibration data, which includes the numeric value in the predetermined range and information indicating a predetermined frequency.

In the above-described vibration control system, the vibration data can include information indicating an amplitude and information indicating a frequency, and the frequency can be set to a substantial resonance frequency of the vibration device.

According to this configuration, by setting the frequency included in the vibration data to the substantial resonance frequency of the vibration device, the vibration device vibrates more easily, and thus strong vibration can be provided.

In the above-described vibration control system, the frequency can be a frequency other than the resonance frequency of the vibration device, and the frequency can be set so as to change mainly in a range of 70% to 130% of the resonance frequency.

When the frequency at which the vibration device is vibrated matches the resonance frequency of the vibration device, there is a risk that chattering vibration will occur in the housing and the like including the vibration device. In view of this, if the frequency at which the vibration device is vibrated is mainly in the range of 70% to 130% of the resonance frequency, the occurrence of chatter vibration can be inhibited. Furthermore, if a configuration is used in which this frequency is not constant but changes with time, it is possible to suppress the likelihood that an operator operating the vibration control system will be given a feeling of discomfort. Note that "mainly in the range of 70% to 130% of the resonance frequency" means that not all frequencies used during vibration need to be included in this range, and some frequencies may be out of the range, as long as most of them are in this range.

The above-described vibration control system can further include a frequency rate increase section configured to receive the eccentric motor drive data from an application including the eccentric motor drive data with a first period, and output the eccentric motor drive data to the reception section with a second period that is higher than the first period.

Since the specifications of the eccentric motor vibration device and the vibration device according to the present disclosure are different from each other, the data update period for the eccentric motor drive data is also different from the data update period for the vibration data of the vibration device according to the present disclosure. Here, although it is conceivable to adjust the data update period for the vibration data of the vibration device according to the present disclosure according to the data update period for the eccentric motor drive data, it is difficult to accurately acquire the update period.

In view of this, the frequency rate increase section receives the eccentric motor drive data with the first period, which is the update period for the eccentric motor drive data, and outputs the eccentric motor drive data to the reception section with the second period, which is higher than the first period. As a result, the output is performed with the second period regardless of the first period in the eccentric motor drive data, and therefore it is not necessary to find out the precise timing of the first period in the eccentric motor drive data. In particular, in the frequency rate increase section, since the second period is set higher than the first period, smoother vibration can be provided.

The above-described vibration control system can further include an eccentric motor vibration device, and the eccentric motor vibration device can be configured to be vibrated based on the eccentric motor drive data.

A vibration control method according to the present disclosure is a method for controlling vibration of a vibration device for which a resonance frequency is higher than that of an eccentric motor vibration device and whose amplitude and frequency are controllable, the method including: receiving eccentric motor drive data that is included in a program for an application and is for causing vibration of an eccentric motor vibration device; generating, based on the received eccentric motor drive data, vibration data indicating a second waveform having an envelope with a change trend that correlates to a change trend of an envelope of a first waveform indicated by vibration of the eccentric motor vibration device vibrated according to the eccentric motor drive data, the second waveform having a higher frequency than the first waveform; and vibrating the vibration device based on the vibration data.

A non-transitory storage medium storing therein a vibration control program according to the present disclosure is a vibration control program for controlling vibration of a vibration device for which a resonance frequency is higher than that of an eccentric motor vibration device and whose amplitude and frequency are controllable, the vibration control program being configured to cause a computer to: receive eccentric motor drive data that is included in a program for an application and is for causing vibration of an eccentric motor vibration device; generate, based on the received eccentric motor drive data, vibration data indicating a second waveform having an envelope with a change trend that correlates to a change trend of an envelope of a first waveform indicated by vibration of the eccentric motor vibration device vibrated according to the eccentric motor drive data, the second waveform having a higher frequency than the first waveform; and vibrate the vibration device based on the vibration data.

A vibration control system comprising according to the present disclosure: at least one processor; a storage medium storing a vibration control program; and a vibration device for which a resonance frequency is higher than that of an eccentric motor vibration device and whose amplitude and frequency are controllable, wherein the vibration control program is configured to cause the processor to; receive eccentric motor drive data that is included in a program for an application and is for causing vibration of the eccentric motor vibration device; and generate vibration data for causing vibration of the vibration device based on the received eccentric motor drive data, and wherein in generating the vibration data, the vibration data, which indicates a second waveform having an envelope with a change trend that correlates to a change trend of an envelope of a first waveform indicated by vibration of the eccentric motor vibration device vibrated according to the eccentric motor drive data is generated, the second waveform having a higher frequency than the first waveform.

According to the present disclosure, it is possible to control the vibration of a vibration device by generating vibration data based on drive data for an eccentric motor without generating new vibration data from scratch.

BRIEF DESCRIPTION OF THE DRAWINGS

FIG. 14 is a diagram showing an actually-measured vibration waveform of an eccentric motor and its envelope.

FIG. 15 is a diagram showing an example of modeling an envelope of a vibration waveform of an eccentric motor.

FIG. 16 is a diagram showing an algorithm for modeling an envelope.

EMBODIMENTS

Hereinafter, an embodiment of a case where the vibration control system according to the present disclosure is applied to a game system is described.

1. Hardware Configuration of Game System

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

1-1. Main Body Apparatus

Figure 1:
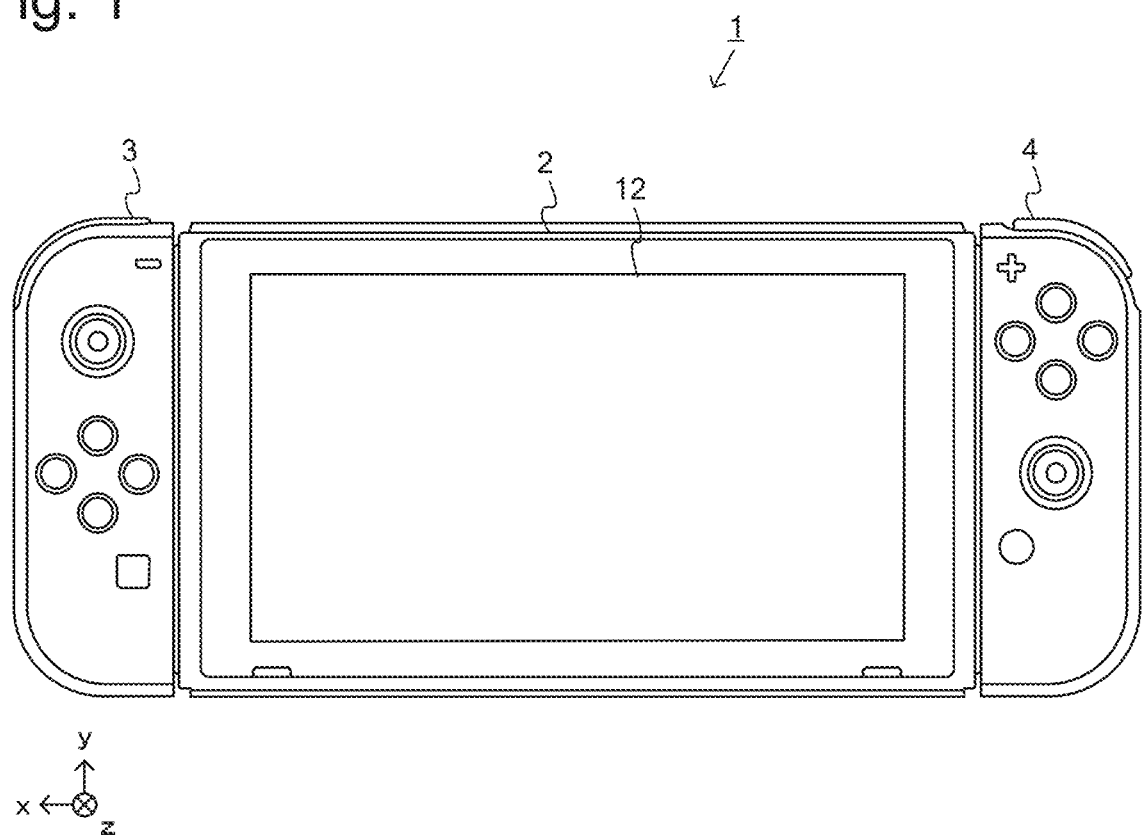
FIG. 1 is a diagram showing an example of a game system in a state where a left controller and a right controller are attached to a main body apparatus.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
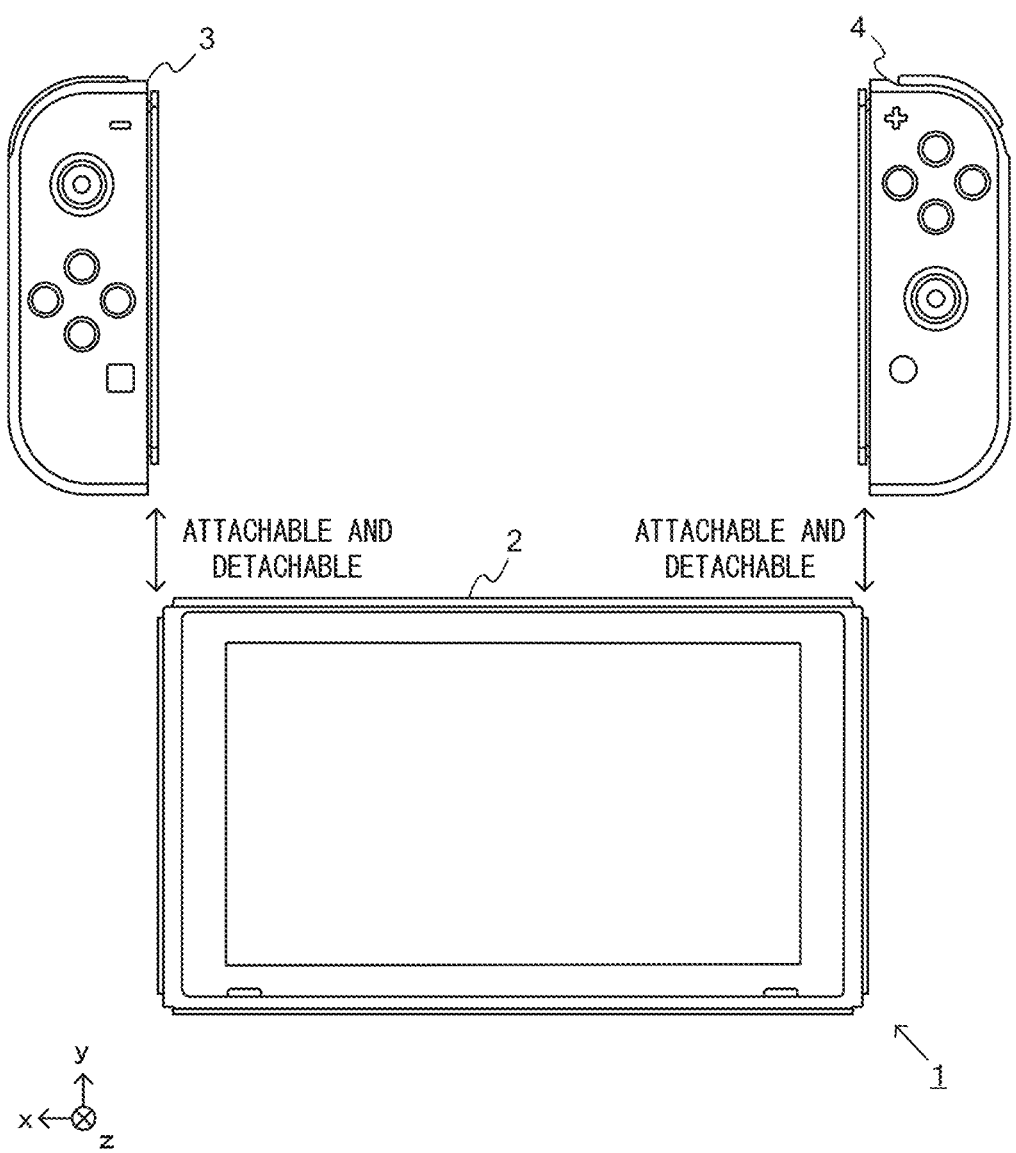
FIG. 2 is a diagram showing an example of a game system in a state where each of the left controller and the right controller is detached from the main body apparatus.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
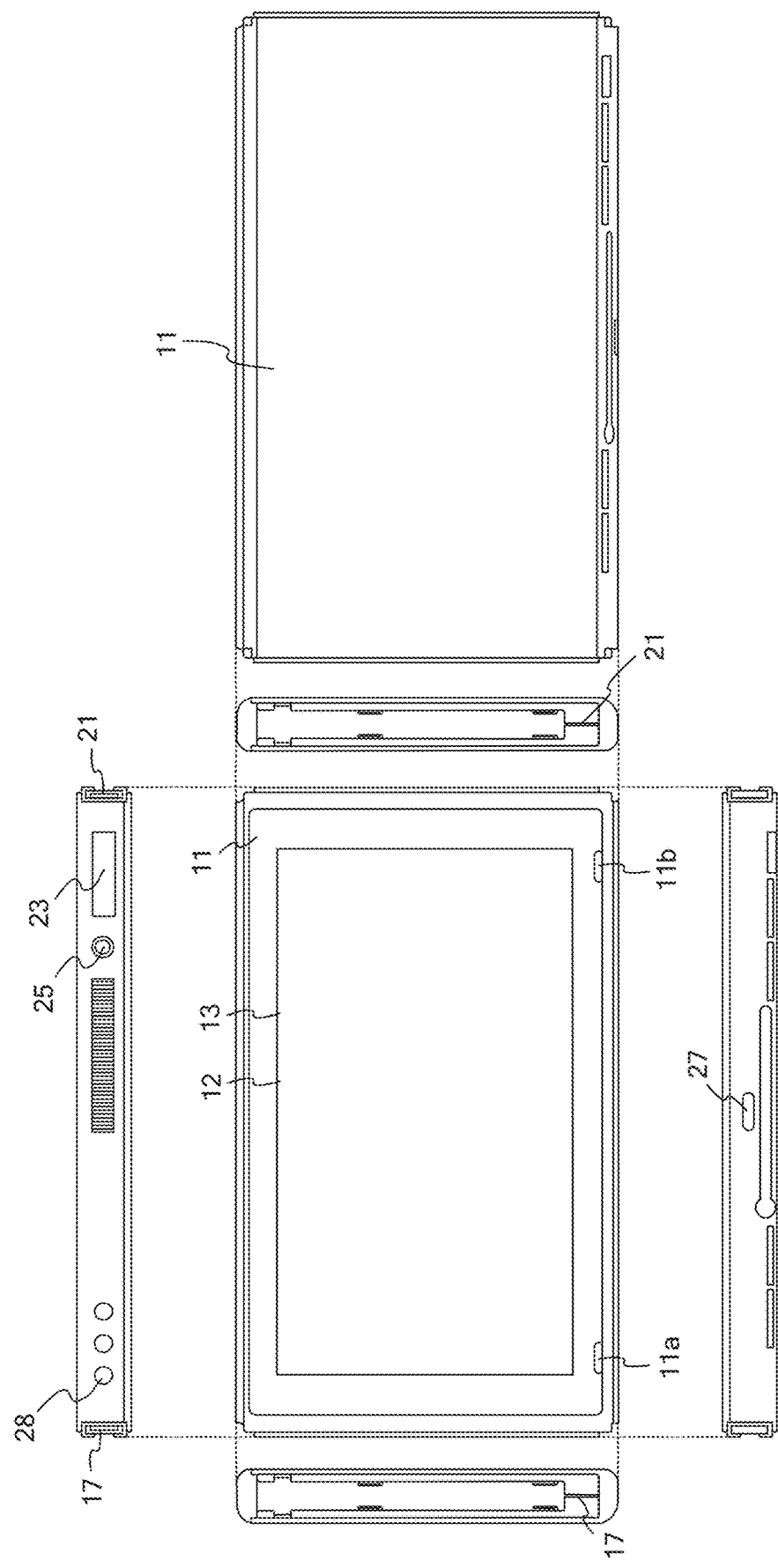
FIG. 3 is six orthogonal views showing an example of the main body apparatus of FIG. 1.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

1-2. Left Controller

Figure 4:
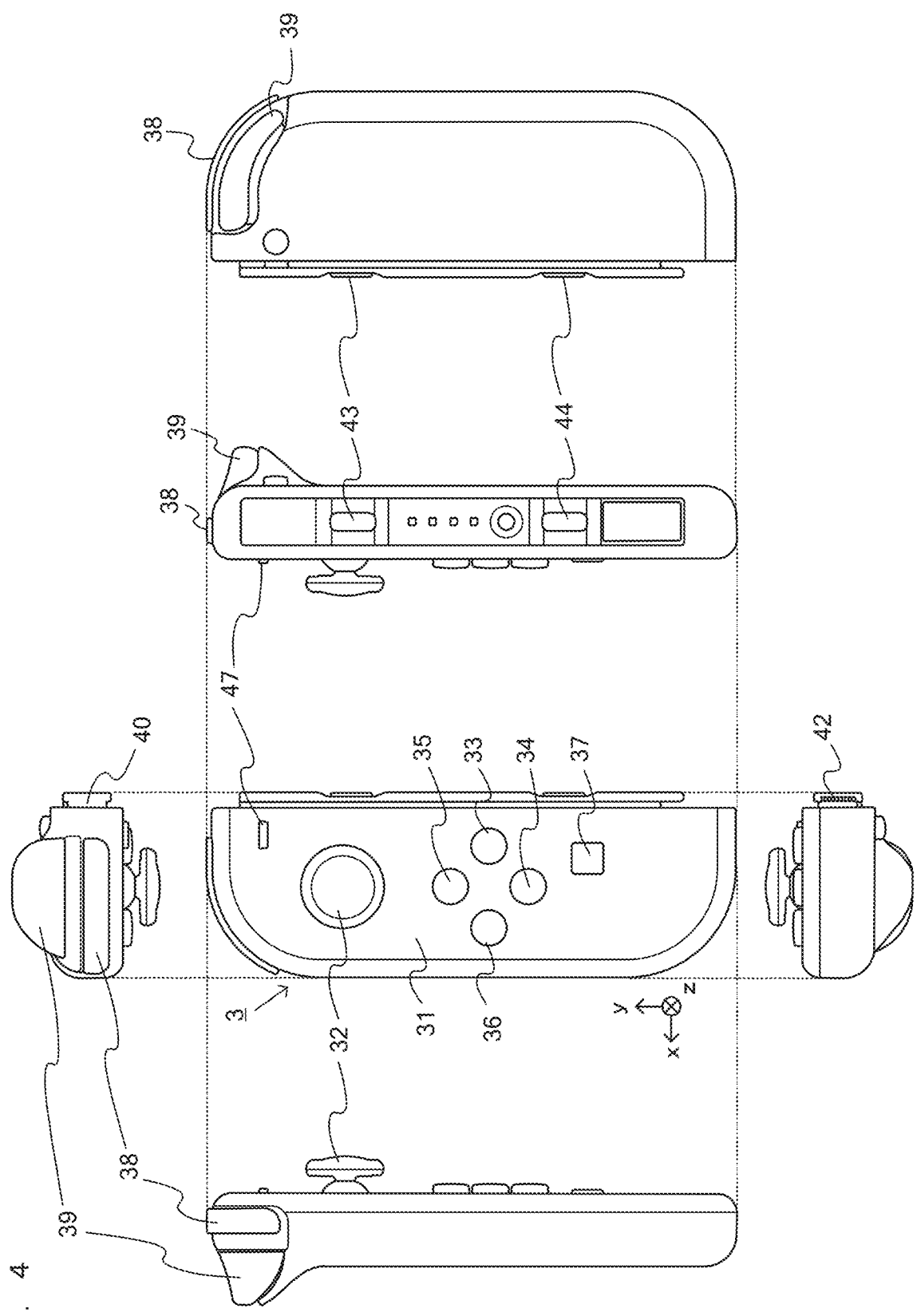
FIG. 4 is six orthogonal views showing an example of the left controller of FIG. 1.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

1-3. Right Controller

Figure 5:
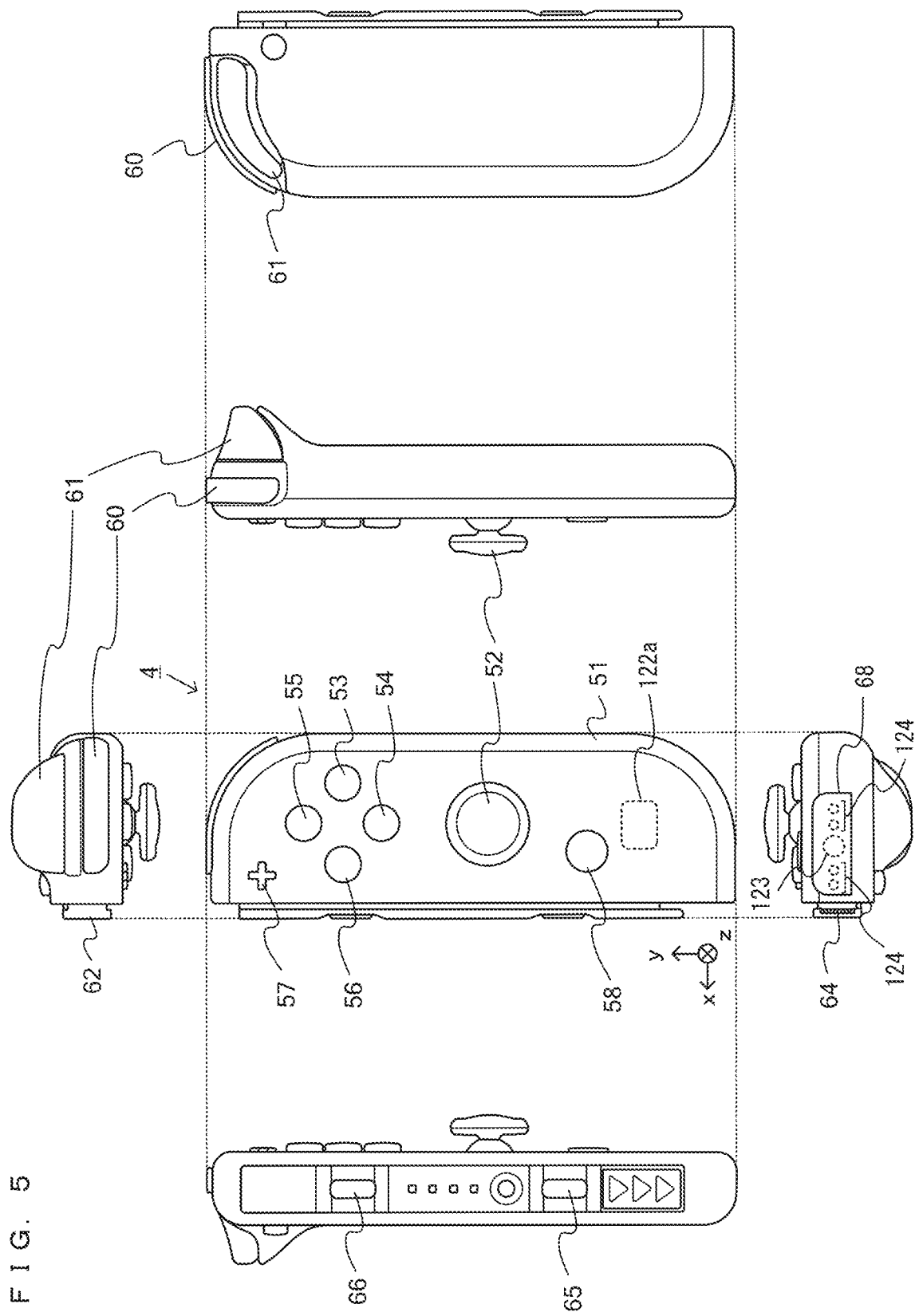
FIG. 5 is six orthogonal views showing an example of the right controller in FIG. 1.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands. Here, for the sake of convenience in the description, it is assumed the outer surface of the housing 51 of the right controller 4 is defined as follows. That is, the housing 51 is formed in an approximate cuboid shape and includes a rectangular first main surface whose lengthwise direction is the up-down direction, and a second main surface opposite thereto. Further, in the housing 51, the upper end surface in the lengthwise direction of the main surfaces constitutes a first end surface, and the lower end surface constitutes a second end surface. Further, the right side surface in the short direction of the two main surfaces constitutes a first side end surface and the left side surface constitutes a second side end surface. Note that the first end surface has a flat surface that faces upward in the lengthwise direction on the left end portion, but curves downward toward the right side and is connected to the upper end of the first side end surface. Further, as will be described later, a curved first R button 60 is disposed on the first end surface. Similarly, the second end surface has a flat surface that faces downward in the lengthwise direction on the left end portion, but curves upward toward the right side and is connected to the lower end of the first side end surface. Further, an infrared image capturing section 123 and an infrared light-emitting section 124, which will be described later, are arranged on the second end surface.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, the right controller 4 includes the curved first R button 60 on the first end surface of the housing 51. Further, a ZR button 61, which protrudes toward the rear surface and can be pressed from above is provided on the rear surface side of the first R button 60. Further, a bulging portion 500 is formed below the ZR button 61. The bulging portion 500 is a region that bulges from the second main surface and has an inclined surface that approaches the second main surface as the bottom is approached from the ZR button 61. Further, similarly to the left controller 3, the right controller 4 includes a second L-button 65 and a second R-button 66.

Further, a window portion 68 is provided on a lower side surface of the housing 51. Although the details will be described later, the right controller 4 includes an infrared image capturing section 123 and an infrared light-emitting section 124, which are placed within the housing 51. The infrared image capturing section 123 captures a portion around the right controller 4 through the window portion 68 such that a down direction of the right controller 4 (a negative y-axis direction shown in FIG. 5) is the image capturing direction. The infrared light-emitting section 124 emits infrared light through the window portion 68 to an image capturing target to be captured by the infrared image capturing section 123 such that a predetermined range about the down direction of the right controller 4 (the negative y-axis direction shown in FIG. 5) is the emission range. The window portion 68 is used to protect a lens of a camera of the infrared image capturing section 123, a light emitter of the infrared light-emitting section 124, and the like and composed of a material (e.g., a transparent material) that transmits light of a wavelength sensed by the camera and light emitted from the light emitter. It should be noted that the window portion 68 may be a hole formed in the housing 51. It should be noted that in the exemplary embodiment, the infrared image capturing section 123 itself includes a filter member for inhibiting the transmission of light of a wavelength other than light sensed by the camera (infrared light in the exemplary embodiment). In another exemplary embodiment, the window portion 68 may have the function of a filter.

Further, although the details will be described later, the right controller 4 includes an NFC communication section 122. The NFC communication section 122 performs short-range wireless communication based on the NFC (Near Field Communication) standard. The NFC communication section 122 includes an antenna 122a, which is used for short-range wireless communication, and a circuit (e.g., an NFC chip) for generating a signal (a radio wave) to be sent from the antenna 122a. It should be noted that the NFC communication section 122 may perform short-range wireless communication through any proximity communication (or contactless communication), instead of performing short-range wireless communication based on the NFC standard. Here, the NFC standard can be used for proximity communication (contactless communication), and "may perform short-range wireless communication through any proximity communication (or contactless communication)" is intended to mean that short-range wireless communication may be performed through other proximity communication except for proximity communication based on the NFC standard.

Further, the right controller 4 includes a terminal 64 for the right controller 4 to perform wired communication with the main body apparatus 2.

1-4. Internal Configuration of Main Body Apparatus

Figure 6:
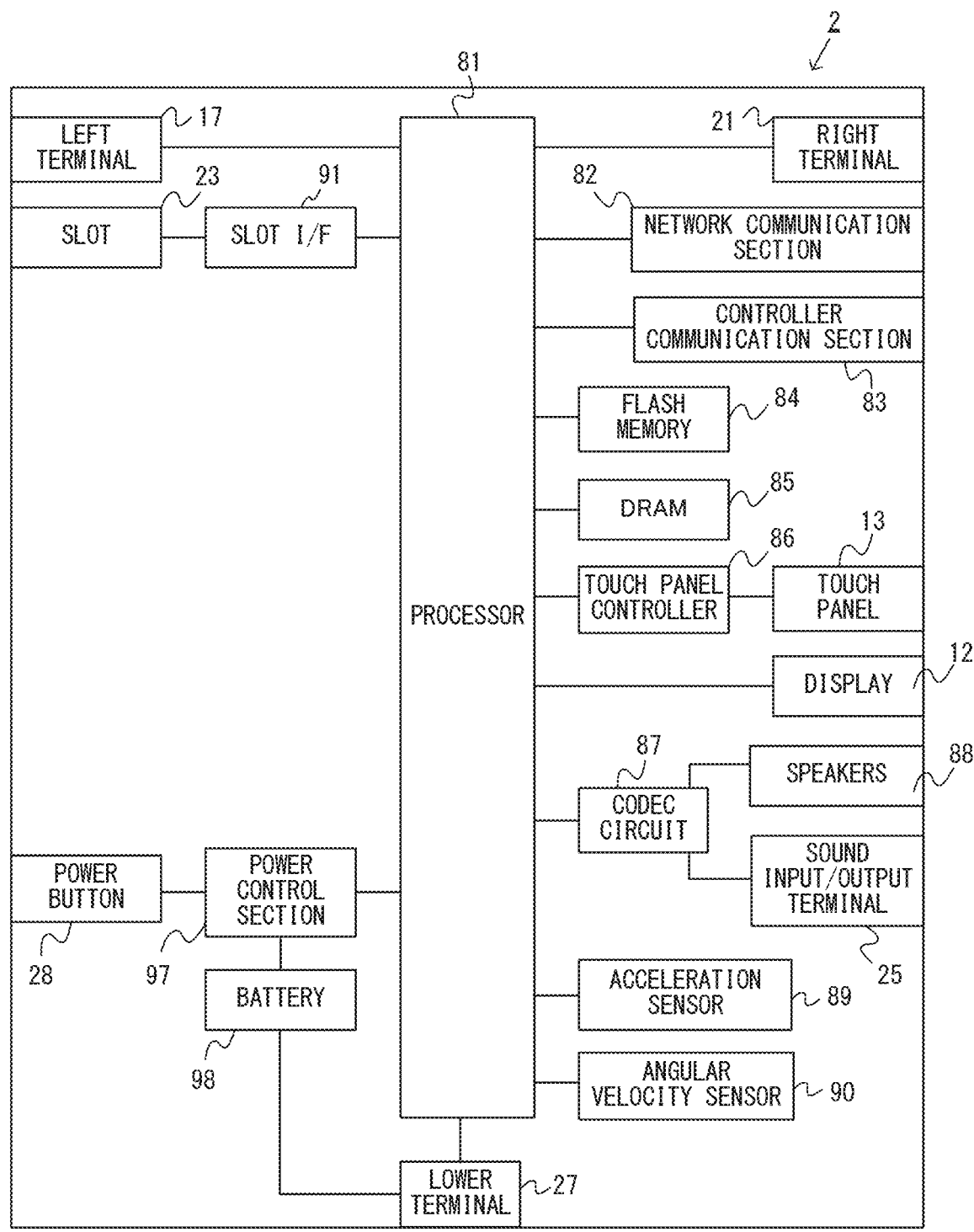
FIG. 6 is a block diagram showing an example of the internal configuration of the main body apparatus of FIG. 1.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

1-5. Internal Configuration of Controller

Figure 7:
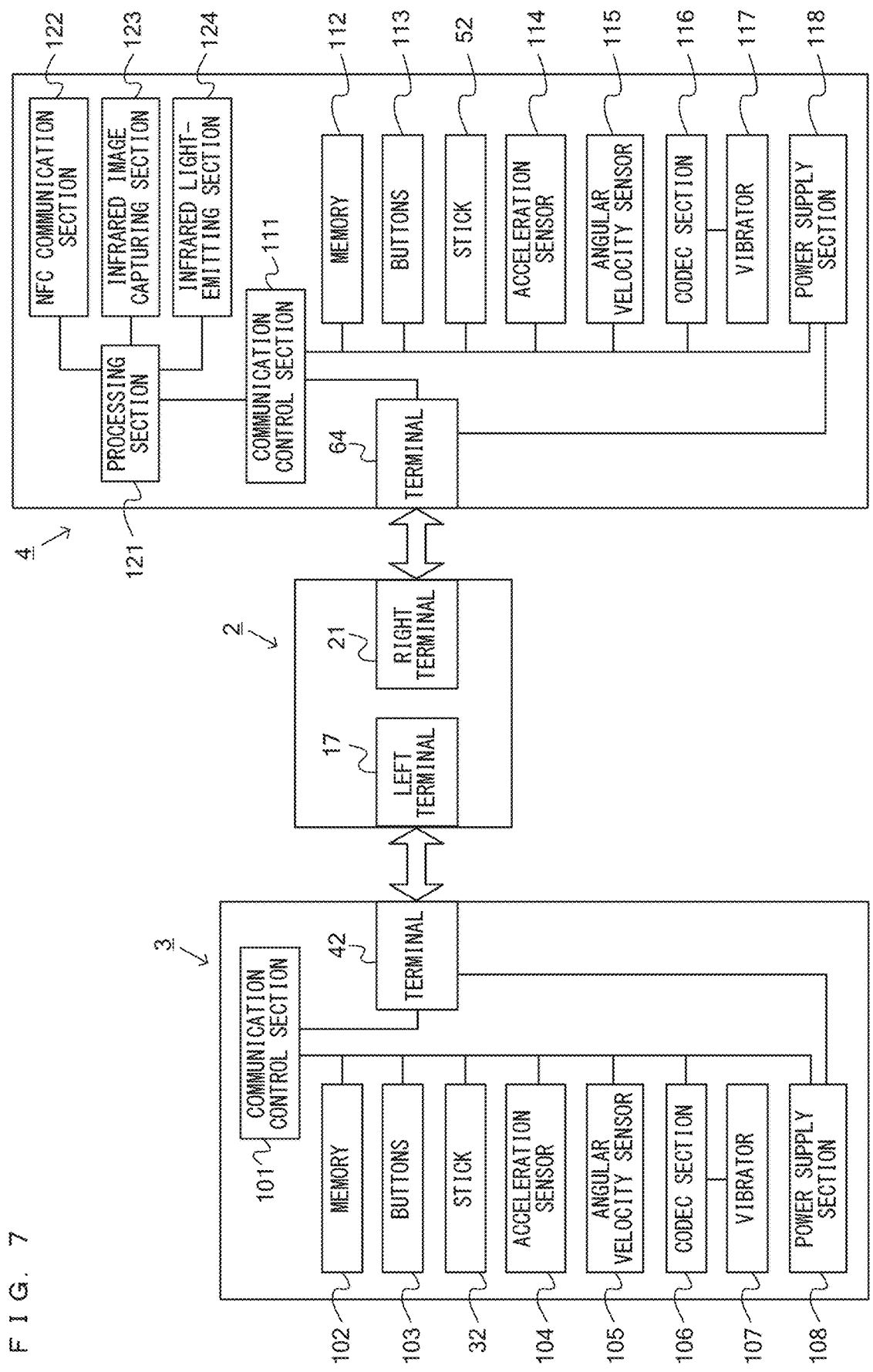
FIG. 7 is a block diagram showing examples of the internal configurations of the main body apparatus, the left controller, and the right controller of FIG. 1.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a vibrator 107 for giving notification to the user by a vibration. In the exemplary embodiment, the vibrator 107 is controlled by a command from the main body apparatus 2. That is, if receiving the above command from the main body apparatus 2, the communication control section 101 drives the vibrator 107 in accordance with the received command. Here, the left controller 3 includes a codec section 106. If receiving the above command, the communication control section 101 outputs a control signal corresponding to the command to the codec section 106. The codec section 106 generates a driving signal for driving the vibrator 107 from the control signal from the communication control section 101 and outputs the driving signal to the vibrator 107. Consequently, the vibrator 107 operates.

More specifically, the vibrator 107 is a linear vibration motor. Unlike a regular motor that rotationally moves, the linear vibration motor is driven in a predetermined direction in accordance with an input voltage and therefore can be vibrated at an amplitude and a frequency corresponding to the waveform of the input voltage. In the exemplary embodiment, a vibration control signal transmitted from the main body apparatus 2 to the left controller 3 may be a digital signal representing the frequency and the amplitude every unit of time. In another exemplary embodiment, the main body apparatus 2 may transmit information indicating the waveform itself. The transmission of only the amplitude and the frequency, however, enables a reduction in the amount of communication data. Additionally, to further reduce the amount of data, only the differences between the numerical values of the amplitude and the frequency at that time and the previous values may be transmitted, instead of the numerical values. In this case, the codec section 106 converts a digital signal indicating the values of the amplitude and the frequency acquired from the communication control section 101 into the waveform of an analog voltage and inputs a voltage in accordance with the resulting waveform, thereby driving the vibrator 107. Thus, the main body apparatus 2 changes the amplitude and the frequency to be transmitted every unit of time and thereby can control the amplitude and the frequency at which the vibrator 107 is to be vibrated at that time. It should be noted that not only a single amplitude and a single frequency, but also two or more amplitudes and two or more frequencies may be transmitted from the main body apparatus 2 to the left controller 3. In this case, the codec section 106 combines waveforms indicated by the plurality of received amplitudes and frequencies and thereby can generate the waveform of a voltage for controlling the vibrator 107.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

Further, the right controller 4 includes a vibrator 117 and a codec section 116. The vibrator 117 and the codec section 116 operate similarly to the vibrator 107 and the codec section 106, respectively, of the left controller 3. That is, in accordance with a command from the main body apparatus 2, the communication control section 111 causes the vibrator 117 to operate, using the codec section 116.

The right controller 4 includes the NFC communication section 122, which performs short-range wireless communication based on the NFC standard. The NFC communication section 122 has the function of a so-called NFC reader/writer. Here, the term "short-range wireless communication" as used herein includes a communication method where a radio wave from an apparatus (here, the right controller 4) develops an electromotive force (e.g., by electromagnetic induction) in another device (here, a device near the antenna 122a). The other device can operate by the developed electromotive force, and may or may not have a power supply. When the right controller 4 (the antenna 122a) and a communication target come close to each other (typically, the distance between the right controller 4 and the communication target becomes a dozen centimeters or less), the NFC communication section 122 becomes able to communicate with the communication target. The communication target is any apparatus capable of performing short-range wireless communication with the NFC communication section 122 and is, for example, an NFC tag or a storage medium having the function of an NFC tag. Alternatively, the communication target may be another apparatus having an NFC card emulation function.

Further, the right controller 4 includes the infrared image capturing section 123. The infrared image capturing section 123 includes an infrared camera for capturing a portion around the right controller 4. As an example, the main body apparatus 2 and/or the right controller 4 calculate information of a captured image (e.g., information related to the luminance of a plurality of blocks into which at least the entirety of a partial area of a captured image is divided or the like), and based on the calculated information, determine a change in the portion around the right controller 4. Further, the infrared image capturing section 123 may capture an image using ambient light, but in the exemplary embodiment, includes the infrared light-emitting section 124, which emits infrared light. The infrared light-emitting section 124 emits infrared light, for example, in synchronization with the timing when the infrared camera captures an image. Then, the infrared light emitted from the infrared light-emitting section 124 is reflected by an image capturing target, and the infrared camera receives the reflected infrared light, thereby acquiring an image of the infrared light. This enables the infrared image capturing section 123 to obtain a clearer infrared light image. It should be noted that the infrared image capturing section 123 and the infrared light-emitting section 124 may be provided as different devices in the right controller 4, or may be provided as a single device in the same package in the right controller 4. Further, in the exemplary embodiment, the infrared image capturing section 123 including an infrared camera is used. In another exemplary embodiment, a visible light camera (a camera using a visible light image sensor) may be used as image capturing means, instead of the infrared camera.

The right controller 4 includes a processing section 121. The processing section 121 is connected to the communication control section 111. Further, the processing section 121 is connected to the NFC communication section 122, the infrared image capturing section 123, and the infrared light-emitting section 124. In accordance with a command from the main body apparatus 2, the processing section 121 performs the process of managing the NFC communication section 122. For example, in accordance with a command from the main body apparatus 2, the processing section 121 controls the operation of the NFC communication section 122. Further, the processing section 121 controls the start of the NFC communication section 122 or controls the operations (specifically, reading, writing, and the like) of the NFC communication section 122 performed on a communication target (e.g., an NFC tag). Further, the processing section 121 receives, from the main body apparatus 2, information to be transmitted to the communication target via the communication control section 111 and passes the information to the NFC communication section 122. Further, the processing section 121 acquires, from the NFC communication section 122, information received from the communication target and transmits the information to the main body apparatus 2 via the communication control section 111.

Further, the processing section 121 includes a CPU, a memory, and the like. Based on a predetermined program (e.g., an application program for performing image processing and various calculations) stored in a storage device (e.g., a non-volatile memory or the like) (not shown) included in the right controller 4, and in accordance with a command from the main body apparatus 2, the processing section 121 performs the process of managing the infrared image capturing section 123. For example, the processing section 121 causes the infrared image capturing section 123 to perform an image capturing operation. Further, the processing section 121 acquires and/or calculates information based on an image capturing result (information of a captured image, information calculated from this information, or the like) and transmits the information to the main body apparatus 2 via the communication control section 111. Further, in accordance with a command from the main body apparatus 2, the processing section 121 performs the process of managing the infrared light-emitting section 124. For example, in accordance with a command from the main body apparatus 2, the processing section 121 controls the light emission of the infrared light-emitting section 124. It should be noted that a memory used by the processing section 121 to perform processing may be provided in the processing section 121 or may be the memory 112.

The right controller 4 includes a power supply section 118. The power supply section 118 has a function similar to that of the power supply section 108 of the left controller 3 and operates similarly to the power supply section 108.

2. Functional Configuration for Vibration Control of Game System

Figure 8:
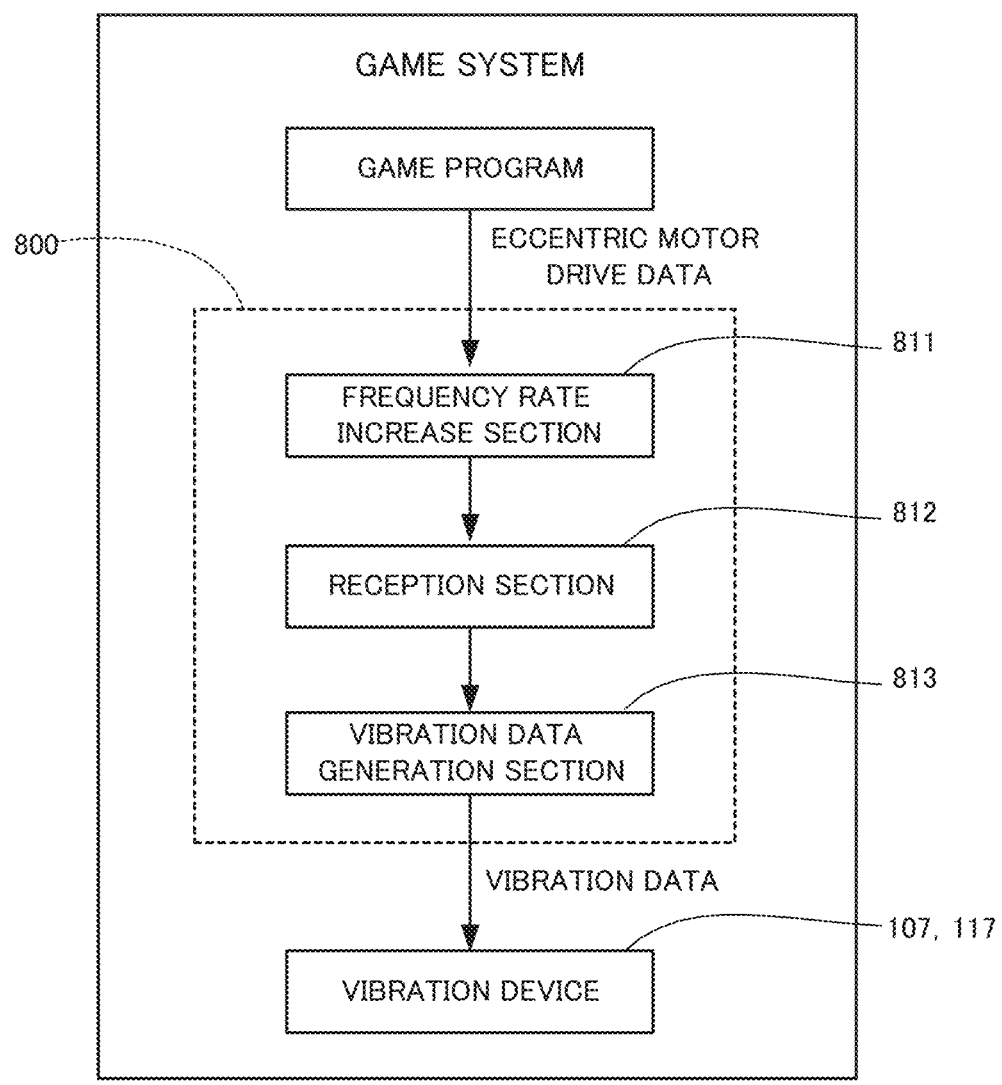
FIG. 8 is a block diagram showing a functional configuration for vibration control in the game system of FIG. 1.

Next, a functional configuration (software configuration) for vibration control in the game system configured as described above is described. FIG. 8 is an example of a functional configuration for vibration control in the game system according to the exemplary embodiment. The processor 81 of the game system expands the game program stored in the flash memory 84 or the external storage medium mounted in the slot 23 to the DRAM 85. Then, the processor interprets and executes the information processing program expanded to the DRAM 85 to control each functional component. As a result, the game system according to the exemplary embodiment functions as a computer including a frequency rate increase section 811, a reception section 812, and a vibration data generation section 813 as a software module 800. Hereinafter, first, the target of vibration to be controlled in the exemplary embodiment is described, and thereafter, a specific vibration control method is described.

2-1. Target of Vibration Control

In the game system according to the exemplary embodiment, it is assumed that a game program that was generated assuming that an eccentric motor vibration device is to be vibrated is executed. Thus, this game program includes eccentric motor drive data for driving an eccentric motor vibration device. However, the vibration devices 107 and 117 used in the above-described game system are linear vibration motors, and therefore the linear vibration motors cannot be directly driven using the eccentric motor drive data.

In view of this, in the exemplary embodiment, the frequency rate increase section 811, the reception section 812, and the vibration data generation section 813 described above generate vibration data for the linear vibration motors based on the eccentric motor drive data, and the linear vibration motors 107 and 117 are driven.

Figure 9:
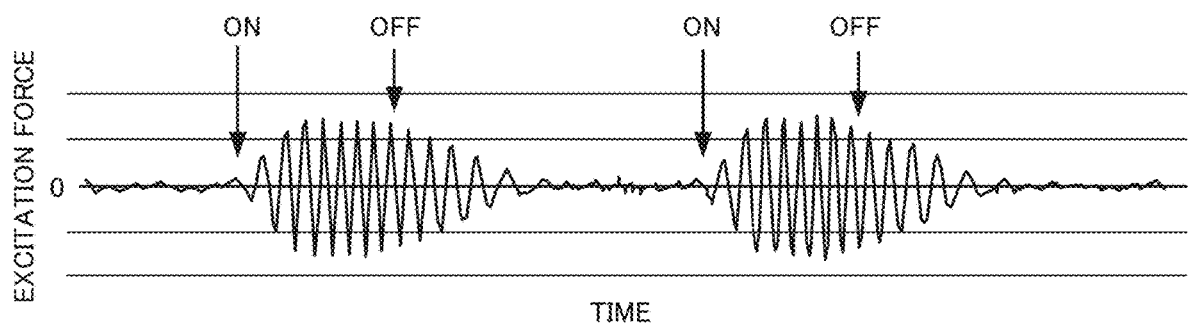
FIG. 9 is a diagram showing an example of a vibration waveform of an eccentric motor.

First, an eccentric motor and a linear vibration motor are described. In a general eccentric motor, for example, a semi-circular vibrator (weight) is fixed to a rotating shaft. In this manner, the center of gravity of the vibrator deviates from the rotating shaft, and therefore vibration is generated due to the centrifugal force of the rotating vibrator. Further, the eccentric motor drive data for driving the eccentric motor may include, for example, an ON/OFF signal for applying a predetermined voltage. FIG. 9 shows the waveform of an excitation force that changes over time due to this eccentric motor. As shown in FIG. 9, with this eccentric motor, when an ON signal is input and a voltage is applied, the excitation force (amplitude) gradually increases, and when an OFF signal is input and the application of voltage is stopped, the excitation force (amplitude) gradually decreases and the vibration stops.

Further, with this eccentric motor, the frequency and the amplitude cannot be controlled independently. For example, with an eccentric motor, when the vibrator rotates according to the applied voltage, the frequency also increases according to the increase in the rotation rate. The centrifugal force generated by this rotation is proportional to the weight of the vibrator and the square of the frequency. This centrifugal force becomes an excitation force for causing vibration, and this excitation force is the amplitude of the vibration.

Figure 10:
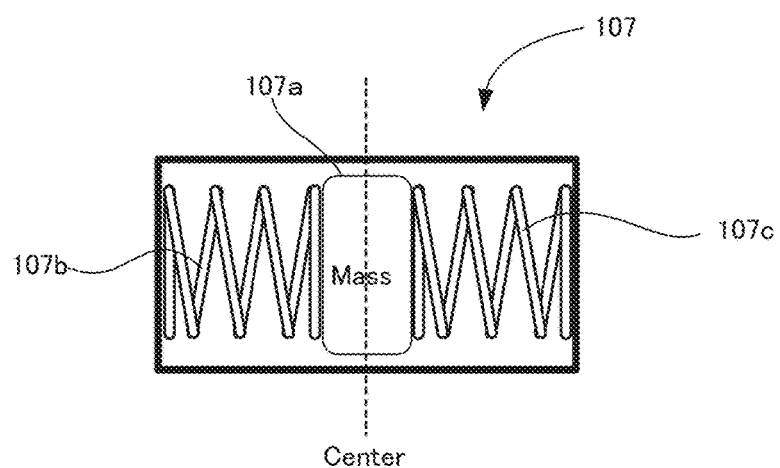
FIG. 10 is a schematic diagram of a linear vibration motor.

Next, the linear vibration motor is described. FIG. 10 is a schematic diagram of a general linear vibration motor. Note that since the two linear vibration motors 107 and 117 described above have substantially the same configuration, the linear vibration motor 107 is described below. As shown in FIG. 10, the linear vibration motor 107 has a vibrator 107a supported between a pair of springs 107b and 107c, and vibration occurs due to the vibrator 107a moving between these springs 107b and 107c due to a magnetic force. At this time, the vibration data input to the linear vibration motor 107 includes data indicating a frequency and data indicating an amplitude, and an applied voltage that changes over time is sequentially generated based on these pieces of data. Then, when the applied voltage becomes large, the amplitude of the vibrator 107a becomes large, and the vibrator 107a vibrates at the input frequency. With this linear vibration motor, when a voltage is applied using vibration data, vibration starts immediately, and when voltage application is stopped (or vibration data is not input), vibration stops immediately.

As described above, since the eccentric motor and the linear vibration motor have different physical structures, the characteristics and control method of the vibrator are different. For this reason, in order to generate vibration data for a linear vibration motor based on eccentric motor drive data, for example, it is necessary to consider any or all of the following points.
 (1) The difference in the frequency characteristics of the vibrator
 (2) The difference in the responsiveness of the vibrator
 (3) The difference in the API for setting the vibration value Hereinafter, these (1) to (3) will be examined.

2-1-1. Difference in Frequency Characteristics of Vibrator

In an eccentric motor, the frequency at which the motor is most likely to vibrate is generally present in a low frequency range such as around 40 Hz, and therefore it is common to drive the eccentric motor at this frequency. In contrast to this, in some types of linear vibration motors, the frequency at which the motor tends to vibrate is present in a relatively high frequency range, for example, around 160 Hz, and therefore driving is commonly performed at this frequency. Thus, if an attempt is made to drive a linear vibration motor at a low frequency such as 40 Hz, there is a possibility that the vibration will be too weak to be suitable for a game. Thus, depending on the type of the linear vibration motor, it is necessary to vibrate at a frequency higher than a frequency suitable for an eccentric motor.

2-1-2. Difference in Responsiveness of Vibrator

As shown in FIG. 9, in the eccentric motor, the excitation force (amplitude) gradually increases after the voltage is applied, and the excitation force (amplitude) gradually decreases and vibration stops after the application of voltage is stopped. Thus, the eccentric motor has a characteristic of low responsiveness to input. On the other hand, the linear vibration motor immediately starts vibration when a voltage is applied, and immediately stops vibration when the application of voltage is stopped. Thus, the linear vibration motor has a characteristic of high responsiveness to input. For example, when ON/OFF signals "101010101010", which indicate the application and stopping of a voltage, are input to an application that drives an eccentric motor, due to the low responsiveness, a case may occur in which the OFF signal is input before the amplitude reaches its maximum after the ON signal is input, and the ON signal is input once again before the amplitude reaches 0. For this reason, when such data is input, the eccentric motor may continue to vibrate at an amplitude with a magnitude that is about 50% of the maximum value of the amplitude. That is, in a certain eccentric motor, the amplitude of vibration is adjusted by switching between an ON signal and an OFF signal, as in "101010101010".

On the other hand, when the above-described signal "101010101010" is input to the linear vibration motor, due to the high responsiveness, there is a possibility that vibration will occur intermittently the same number of times as the number of "1"s, which are ON signals, that is, 6 times. For this reason, if the signal "101010101010" is input to the linear vibration motor, it may not be possible to generate the vibration that would be expected with the eccentric motor as described above. Thus, due to such a difference in responsiveness as well, it may not be possible to directly apply the eccentric motor drive data to the linear vibration motor.

2-1-3. Difference in API for Setting Vibration Value

In the API (Application Programming Interface) for setting the vibration value of the eccentric motor, for example, the following vibration value is specified. The eccentric motor generates an excitation force (amplitude) due to a voltage being applied over time according to such vibration values arranged in a time series.
 (1) Specification of ON/OFF signals (1/0) by binary signal
 (2) Designation of numerical values in a predetermined numeric range (e.g., 0.0 to 1.0)
 (3) Designation with labels such as Weak and Strong (1) indicates an ON signal indicating a voltage for generating a predetermined amplitude and an OFF signal indicating a voltage of 0. (2) designates a numeric value (floating point number) indicating a voltage between 0.0, at which the voltage is 0, and 1.0, which indicates the voltage for generating the maximum amplitude. (3) indicates a predetermined voltage for generating a weak amplitude (Weak) and a strong amplitude (Strong). Note that the method for designating the vibration value of the eccentric motor is not limited to these, and for example, a method of designating the time (ON time) for which a predetermined voltage is applied may also be used.

In the control of the eccentric motor, the desired excitation force (amplitude) is realized by arranging the vibration values as described above in a time series, whereas in the control of the linear vibration motor, the amplitude (or voltage value indicating the amplitude) and the frequency are designated separately, as described above. Thus, it is necessary to generate data indicating the amplitude and frequency for the linear vibration motor based on the eccentric motor drive data.

Further, in generating the vibration value for the linear vibration motor from the vibration value for the eccentric motor, it is desirable to accurately ascertain how long the vibration value for the eccentric motor is to be continued. However, for example, depending on the game program, there are those that output the vibration value at 30 Hz and those that output the vibration value at 60 Hz, but the ON time indicated by a "1" differs by a factor of 2 between the case where the vibration values of "010" are output at 30 Hz and the case where the vibration values of "010" are output at 60 Hz. Alternatively, binary information is output at a variable period in some cases. Thus, it is difficult to accurately ascertain how long the ON time and the OFF time continue in a system in which the update period of the game program cannot be acquired.

Figure 11:
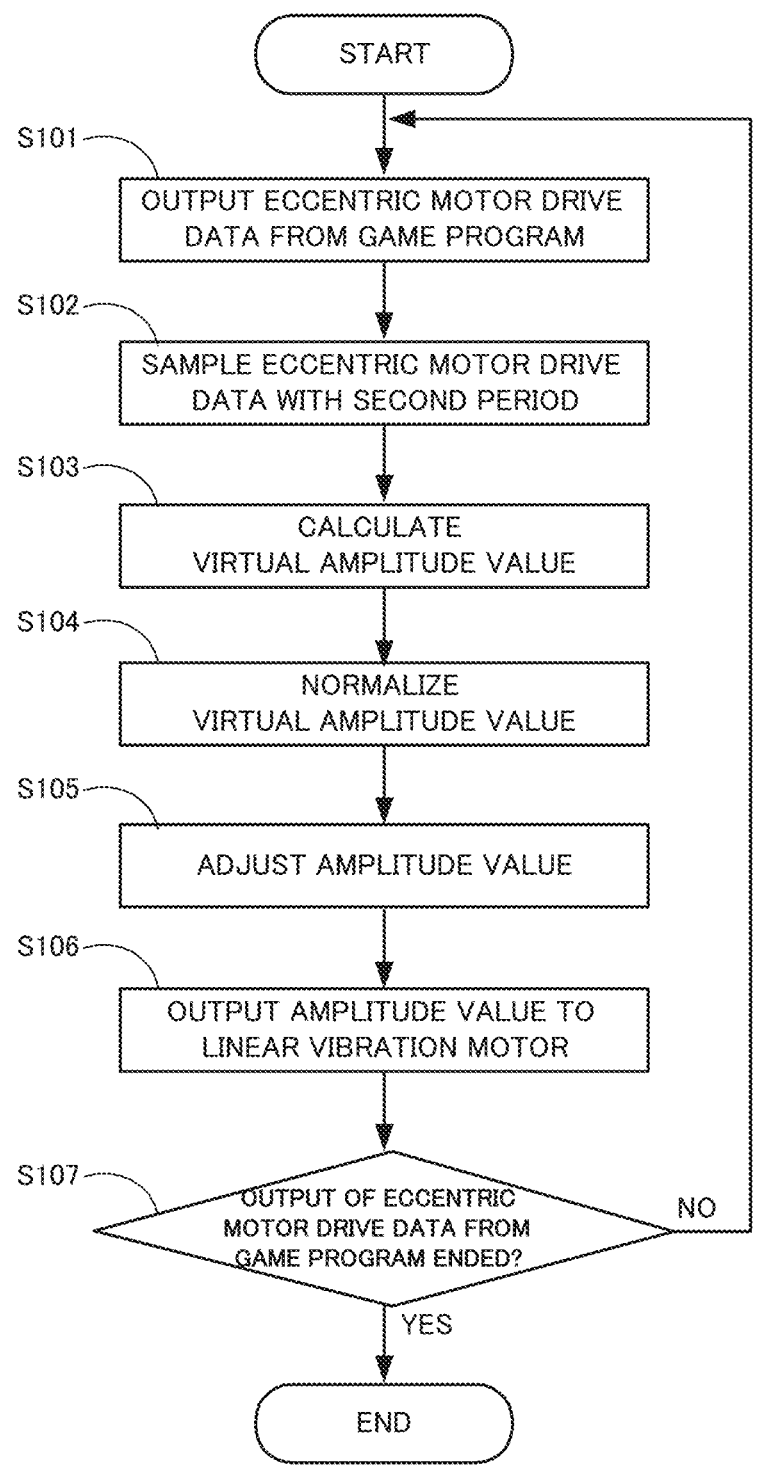
FIG. 11 is a flowchart showing processing for generating vibration data for vibrating a linear vibration motor based on eccentric motor drive data.

In the exemplary embodiment, in consideration of the three differences above, in the frequency rate increase section 811, the reception section 812, and the vibration data generation section 813 described above, vibration data for driving the linear vibration motor is generated based on the eccentric motor drive data as follows. This point is described with reference to the flowchart of FIG. 11.

2-2. Frequency Rate Increase Section

As described above, it is difficult to accurately ascertain the update period of the binary information and the like output from the game program, that is, to accurately ascertain the ON time and OFF time of the vibration. In view of this, regardless of the update period (first period) from the game program, the frequency rate increase section 811 outputs the eccentric motor drive data with a period (second period) that is higher than the update period.

Figure 12:
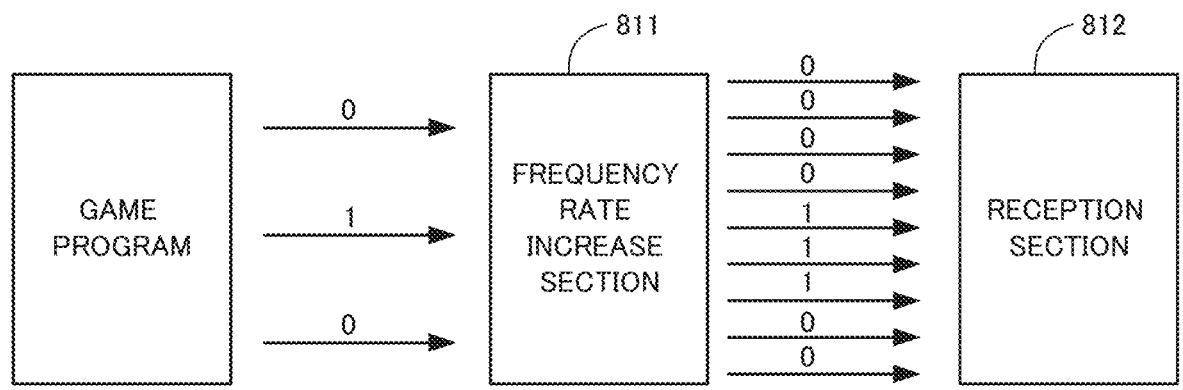
FIG. 12 is a block diagram showing the function of a frequency rate increase section.

For example, as shown in FIG. 12, when binary information is output from the game program with the first period (step S101), the frequency rate increase section 811 samples this with the second period (step S102) and outputs it to the reception section 812. Here, as an example, the first period is 60 Hz and the second period is 200 Hz. More specifically, when a "010" signal is output from the game program at 60 Hz, the frequency rate increase section 811 first receives the "0" signal from the application, and in the period up to when the information of the next "1" is received, the frequency rate increase section 811 outputs the signal "0000" by sampling at 200 Hz. Subsequently, the signal "1" is received from the application, and the signal "111" is output by sampling at 200 Hz until the information of the next "0" is received.

Here, since the output of the frequency rate increase section 811 for the first "0" output from the application is "0000", the second period is 200 Hz, and therefore the output from the game program is reproduced such that the "0"s continue for 5 msec*4=20 msec. Since the output of the frequency rate increase section 811 for the next "1" is "111", the output from the game program is reproduced such that the "1"s continue for 5 msec*3=15 msec. As described above, the update period of the binary information from the game program is not constant in some cases, but the frequency rate increase section 811 reproduces the time for which the signal is output by sampling the received information at a predetermined second period.

Note that in the above-described example, the second period is set to 200 Hz, but there is no particular limitation thereto. However, the higher the second period is, the shorter the period in which the amplitude, which will be described later, is calculated, and therefore more detailed control becomes possible. In addition, the second period can be set according to the period of the vibration data input to the linear vibration motor. For example, assuming that the main body apparatus 2 described above and the controllers 3 and 4 communicate with each other with a period of 200 Hz, vibration data is input to the linear vibration motors of the controllers 3 and 4 with a period of at most 200 Hz. Thus, in consideration of the communication of a device such as a controller provided with a linear vibration motor, for example, the second period can be set so as to be the maximum period of the communication.

2-3. Reception Section

The reception section 812 receives the eccentric motor drive data output from the frequency rate increase section 811 with the second period, and outputs this to the vibration data generation section 813 described next with the same second period.

2-4. Vibration Data Generation Section

Next, the vibration data generation section 813 is described. As described above, in order to drive a linear vibration motor, vibration data including data indicating the amplitude and data indicating the frequency is required. Hereinafter, the function of the vibration data generation section 813, that is, the method of generating data indicating the amplitude and data indicating the frequency based on the eccentric motor drive data sampled with the second period as described above is described.

2-4-1. Setting of Data Indicating Frequency

As described above, the eccentric motor and the linear vibration motor may have different frequencies at which vibration is likely to occur. In view of this, with the vibration data generation section 813, a frequency at which vibration is likely to occur when the linear vibration motor is incorporated in the housing is set as the drive frequency of the motor. Such a drive frequency can be, for example, a substantial resonance frequency of a linear vibration motor. The substantial resonance frequency is a frequency in the vicinity of the resonance frequency, and can be, for example, a frequency in the range of 70% to 130% of the resonance frequency. Note that if the drive frequency is the same as the resonance frequency, for example, chatter vibration may occur in the housings of the controllers 3 and 4, and therefore the drive frequency may be set in the above-described range other than the resonance frequency.

Further, if the vibration frequency is always constant, the user holding the controllers 3 and 4 may feel discomfort, and therefore, for example, the drive frequency can also be changed in the above-described range. For example, if the resonance frequency is 170 Hz, the drive frequency can be changed between 146 and 154 Hz with a period of 20 Hz, centered about 150 Hz. Note that this is an example, and the range of the drive frequency and the period of changing the drive frequency can be changed as appropriate. When the drive frequency as described above is made into a set with the data indicating the amplitude described next and is input to the linear vibration motor with a predetermined period, the linear vibration motor can be vibrated.

2-4-2. Setting of Data Indicating Amplitude

Figure 13:
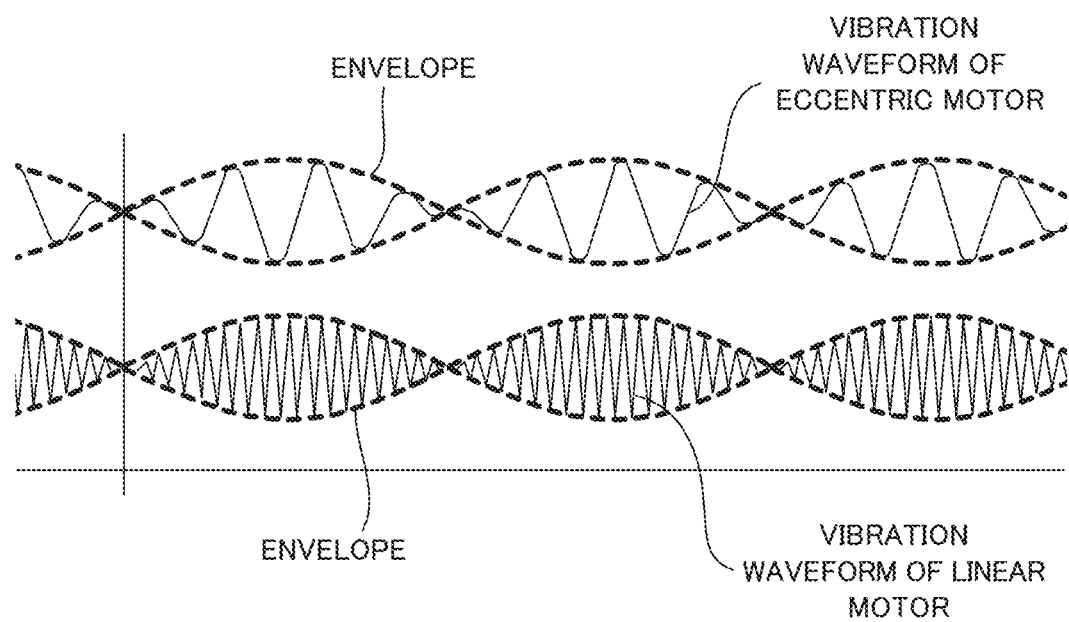
FIG. 13 is a diagram showing an example of a vibration waveform of an eccentric motor and a vibration waveform of a linear vibration motor.

If the vibration of the eccentric motor is to be reproduced by the linear vibration motor, it is conceivable to reproduce the vibration waveform of the eccentric motor with not the vibration waveform of the linear vibration motor itself but its envelope (here, indicating a line connecting the peaks of the amplitude of each wave on the positive side and the negative side in the vibration waveform indicating the relationship between the time and the amplitude), in consideration of the high responsiveness and resonance frequency of the linear vibration motor in the exemplary embodiment. However, according to a study by the inventor, it was found that reproducing the envelope of the vibration waveform of the eccentric motor with the envelope of the linear vibration motor yields a feeling of vibration that is more similar to that of an eccentric motor than reproducing the vibration waveform of the eccentric motor with the envelope of the linear vibration motor. That is, as shown in FIG. 13, this means that reproducing the envelope (dotted line) of the vibration waveform (first waveform) of the eccentric motor instead of the vibration waveform of the eccentric motor using the envelope of the vibration waveform (second waveform) of the linear vibration motor makes it possible to obtain a feeling closer to the vibration of the eccentric motor. Note that in the graph of FIG. 13, the horizontal axis indicates time and the vertical axis indicates amplitude, but the vibration waveforms of the two motors are simply aligned vertically, and the magnitudes of the amplitudes of the two motors are not in comparison with each other.

The envelope of the vibration waveform of the eccentric motor referred to here is assumed to be as follows.

(1) An envelope obtained when the eccentric motor vibrates in the case where an application equipped with a game having the same content as the application of the exemplary embodiment is executed in a game system in which the eccentric motor is mounted.

(2) An envelope obtained when an eccentric motor vibrates in the case where, for example, a controller in which the eccentric motor is mounted is connected to the game system according to the exemplary embodiment.

It should be noted that the amplitude and frequency do not have to be exactly the same in the above-mentioned "reproduction" with the envelope. That is, since the outputtable range for the amplitude is limited by the performance of the linear vibration motor, there is a possibility that the amplitude of the envelope of the linear vibration motor will be smaller than the amplitude in the envelope of the vibration waveform of the eccentric motor. Thus, "reproduction" means matching (correlating) the change trend in the amplitude of the envelope of the eccentric motor with the change trend in the amplitude of the envelope of the linear vibration motor. Specifically, the envelope for the linear vibration motor can be generated by multiplying the envelope for the eccentric motor normalized in the amplitude direction by the amplitude value of the linear vibration motor set in the application. Note that the method of matching the change trend is not limited to this. Further, the change trend (e.g., increase/decrease) need not be exactly the same.

For example, when generating the vibration of an eccentric motor as shown in FIG. 14, an envelope that reproduces this envelope is modeled. In the following, modeling performed in the case where binary information of 1/0 (an ON/OFF signal) is input as eccentric motor drive data is described.

As described above, since the eccentric motor may have low responsiveness, as shown in FIG. 14, the envelope of the vibration waveform gradually increases in amplitude with the elapse of time when the ON signal is input, and thereafter, when the OFF signal is input, the amplitude gradually decreases. In view of this, the inventor of the present disclosure performed modeling of the envelope by referring to the actually-measured values of several vibrations.

FIG. 15 shows the change over time in the modeled amplitude, and shows a reproduction of the envelope of the vibration waveform of the eccentric motor. Further, FIG. 16 is an example of an algorithm for calculating the amplitudes constituting this envelope. Note that for convenience of description, only the amplitudes on the positive side are shown here. When binary information of 1/0 (ON/OFF signals) of the eccentric motor drive data sampled at 200 Hz in the frequency rate increase section 811 is input from the reception section 812 to the vibration data generation section 813 as described above, the binary information is input every 5 msec (1/200 sec), and an amplitude value indicating a point on the envelope is calculated as follows (step S103). Hereinafter, this amplitude value will be referred to as a virtual amplitude value.

First, in this example, the maximum value of the virtual amplitude value is set to a predetermined value between 13 and 14. Then, in the algorithm shown in FIG. 16, at a certain time t0, when "1" is input (isEnable), the value (next) obtained by multiplying the current amplitude (current) by 0.93 and further adding 1.0 to the result is the amplitude of the next time t1 (5 msec after t). On the other hand, when "0" is input (else), the value (next) obtained by multiplying the current amplitude (current) by 0.93 is the amplitude at the next time t1. By performing such an operation, as shown in FIG. 15, the amplitude gradually increases while "1 (ON signal)" is input, and the amplitude is almost constant after the elapse of a predetermined time. Then, while "0 (or OFF signal)" is input, the amplitude gradually decreases and approaches 0. In this manner, when the algorithm of FIG. 16 is used, it is possible to generate an envelope having a change trend that correlates to the change trend of the envelope of the vibration waveform of the eccentric motor. As a result, for example, it is possible to generate a vibration waveform having an envelope whose shape is similar or analogous to the envelope of the vibration waveform of the eccentric motor as shown in FIG. 15.

Note that the algorithm for modeling shown in FIGS. 15 and 16 is an example, and for example, the numerical values 0.93 and 1.0 and the maximum value of the virtual amplitude value described above are values that have been tuned based on the measured value of the vibration. Thus, these values can be adjusted according to the type and structure of the eccentric motor and the linear vibration motor. In the first place, the method for calculating the amplitude so as to follow the envelope is not limited to FIGS. 15 and 16, and it is sufficient to use a method in which the amplitude gradually increases when "1 (ON signal)" is input, and the amplitude gradually decreases when "0 (OFF signal)" is input. Thus, in the examples of FIGS. 15 and 16, the amplitude converges at a predetermined value when "1" is input for a predetermined time, but for example, the amplitude may also continue to change without converging in this manner.

Figure 17:
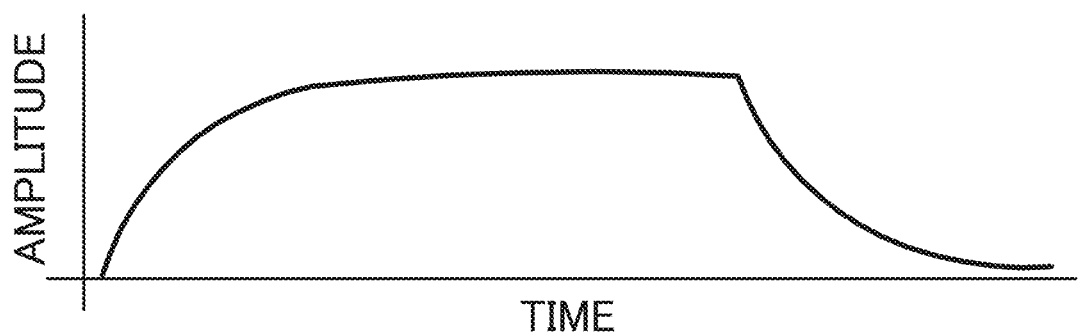
FIG. 17 is a diagram showing an example of reproducing an envelope from eccentric motor drive data.
Figure 18:
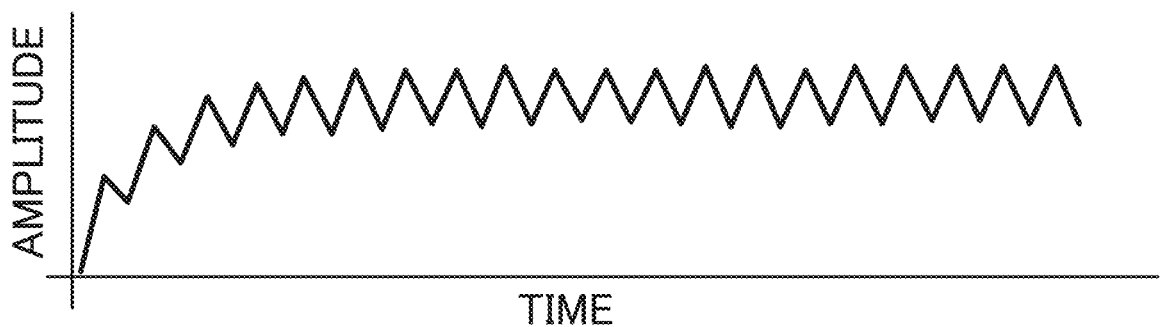
FIG. 18 is a diagram showing an example of reproducing an envelope from eccentric motor drive data.
Figures 19, 20:
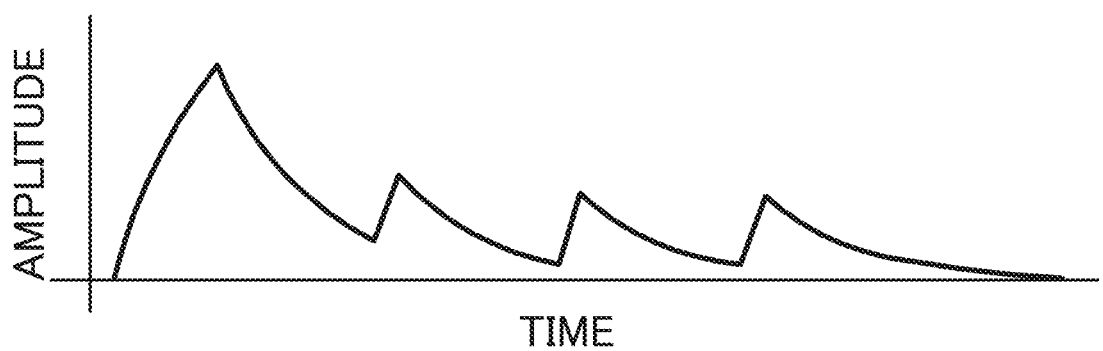
FIG. 19 is a diagram showing an example of reproducing an envelope from eccentric motor drive data.
FIG. 20 is a diagram showing an algorithm for modeling an envelope.

When the algorithm of FIG. 16 as described above is used, for example, the envelopes shown in FIGS. 17 to 19 can also be generated. In the example of FIG. 17, "1 (ON signal)" is input for a predetermined amount of time, and thereafter "0 (OFF signal)" is input for a predetermined amount of time (e.g., "111 . . . 111000000"). As a result, an envelope with low responsiveness, which is unique to an eccentric motor, is reproduced, in which the amplitude gradually increases, then converges at a predetermined value and becomes approximately constant, and then the amplitude gradually decreases.

In the example of FIG. 18, "1" and "0" are input alternatingly. As a result, an envelope whose amplitude hovers at about 50% of the maximum amplitude is reproduced. That is, the low responsiveness of the eccentric motor can be reproduced well. In an eccentric motor, the amplitude does not reach the maximum value immediately after 1 is input, but gradually increases, and conversely, the amplitude does not reach 0 immediately after O is input, but gradually decreases. Thus, when the input of 1 and 0 is repeated, vibration occurs such that an amplitude of about 50% of the maximum amplitude continues.

In the example of FIG. 19, after "1" is first input a predetermined number of times, "0" continues a predetermined number of times, and "1" is input once every predetermined number of times of inputting "0" (e.g., "1111000000100000010000001000000"). The amplitude gradually increases due to "1" first being input a predetermined number of times, but the amplitude gradually decreases due to "0" continuing for a predetermined number of times. Note that since "1" is input at predetermined time intervals during the decrease in amplitude, the amplitude increases each time. This envelope also reproduces the low responsiveness of the eccentric motor well.

Note that the above-described example corresponds to the case where the setting of the vibration value of the API of the eccentric motor described above is (1). Since the other (3) is equivalent to the binary information, it can be processed in the same manner as (1). On the other hand, if (2) is a set value, that is, if a numerical value in a predetermined range such as a vibration value of 0.0 to 1.0 is specified, an algorithm such as that shown in FIG. 20 can be used, for example. In this case, an input numerical value between 0.0 and 1.0 is input to "value".

Next, the virtual amplitude value calculated every 5 msec is normalized to a value of 0 to 1 (step S104). For example, if the virtual amplitude value is divided by its maximum value (predetermined value between 13 and 14 in the above-described example), the virtual amplitude value is normalized to a value between 0 and 1 and can be used as data of the amplitude value for controlling the linear vibration motor.

Next, the normalized amplitude value may be adjusted as needed (step S105). For example, adjustment for raising the calculated amplitude value to the x-th power is performed. In the case where x=2, if the normalized amplitude value is 0.5, the adjusted amplitude value is 0.25. Thus, if the amplitude value before adjustment is large, a small amplitude value becomes smaller and a large amplitude value becomes larger by finding the square. That is, with this adjustment, it is possible to clarify the distinction between strong vibration and weak vibration.

Subsequently, the adjusted amplitude value is input to the linear vibration motors provided in the controllers 3 and 4, and the linear vibration motor is vibrated (step S106). In this manner, the processing of the binary information of the eccentric motor drive data is performed every 5 msec until the output from the application ends (NO in step S107).

Figure 21:
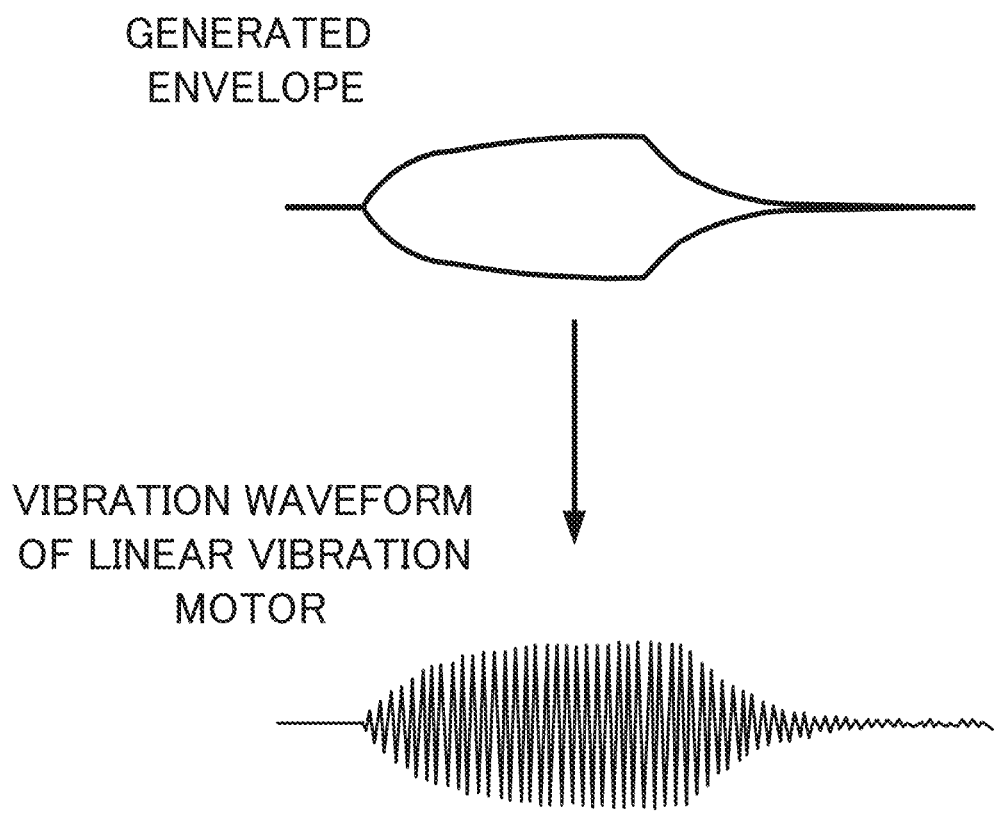
FIG. 21 is a diagram showing a vibration waveform for a linear vibration motor obtained based on a generated envelope.

In the above description, generation of the positive side of the envelope was described, but the negative side is also generated in the same manner. As a result, an envelope that imitates the vibration waveform of the eccentric motor as shown in FIG. 21 is generated, and then vibration data indicating a vibration waveform that has this envelope is generated at the above-mentioned drive frequency, and a linear vibration motor is driven according thereto.

3. Characteristics

As described above, according to the exemplary embodiment, vibration data including data indicating the frequency and data indicating the amplitude is generated based on the binary information and the like included in the eccentric motor drive data, and thereby vibration of the linear vibration motor is performed. Thus, vibration data can be generated based on the drive data for vibrating the eccentric motor vibration device, and therefore it is not necessary to create the vibration data for the linear vibration motor from scratch, and as a result, the burden on the application creator can be reduced.

4. Modified Examples

Although the embodiments of the present disclosure have been described above, the present disclosure is not limited to the above-described embodiments, and various modifications can be made without departing from the gist of the present disclosure. For example, the following modifications are possible. Further, the following modifications can be combined as appropriate.

(1) In the above-described embodiment, when processing the eccentric motor drive data, the frequency rate increase section processes the data update period with a high period, but the frequency rate increase section is not an essential configuration, and the eccentric motor drive data can be received directly in the reception section, and thereafter, this can be output to the vibration data generation section, for example, with the same period or a predetermined period.

(2) The hardware configuration of the above-described game system is an example, and at least a linear vibration motor may be provided as a vibration device and a computer capable of performing the above-described control may be installed. Thus, the above-described game system may be a system in which the main body device 2 and the controllers 3 and 4 are detachable as described above, or a game system in which these are unified. Further, the game program may also be wirelessly transmitted to the game system.

(3) In the above-described embodiment, the generated vibration data for the linear vibration motor is data for a set of a value indicating a frequency and a value indicating an amplitude, but the vibration signal (vibration waveform) itself can also be used as vibration data.

(4) In the above-described embodiment, the game system is provided with a linear vibration motor, but an eccentric motor can also be provided and vibrated. As a result, the eccentric motor can be vibrated using the drive data for the eccentric motor without generating the vibration data for the linear vibration motor.

(5) In the above-described embodiment, an example of generating vibration data for the game system shown in FIGS. 1 to 7 was shown, but a game can also be played on the game system using various controllers other than the attached controllers. Examples of the controllers include those used with one hand, those used with both hands, those provided with a plurality of vibration devices, and the like, and vibration corresponding to the type of the controller is required in some cases. In consideration of such a case, with the vibration data generation section 813, vibration data corresponding to the characteristics of the controller can be corrected, and the vibration data resulting from such correction can be transmitted to various controllers.

Note that the above-described processing of the frequency rate increase section 811, the reception section 812, and the vibration data generation section 813 including such correction may also be performed by any of the main body apparatus 2, the controllers 3 and 4, and the like of the game system 1. Further, the program for performing these processes may be stored in an external storage medium together with the game program. Further, the game program may also be stored not in the external storage medium, but in an internal storage medium of the game system 1. Alternatively, the program for the above-described processing and the game program may be stored in a server on a connectable network.

(6) In the above-described embodiment, the motor to be actually vibrated is a linear vibration motor, but the present disclosure is not limited to this, and the present disclosure can also be applied to a vibration device using a piezoelectric element or a voice coil.

(7) The vibration control system according to the present disclosure is not limited to a game system, and can be applied to all systems equipped with the above-described vibration device and a computer capable of performing the above-described processing.

DESCRIPTION OF REFERENCE NUMERALS

1 Game system (vibration control system)
107 Vibration device
117 Vibration device
811 Frequency rate increase section
812 Reception section
813 Vibration data generation section

What is claimed is:

1. A vibration control system comprising:
    a data receiver to receive eccentric motor drive data for an eccentric motor vibration device, the received eccentric motor drive data sampled at a first rate;
    a vibration device having a resonance frequency that is higher than suitable for the eccentric motor vibration device and whose vibration amplitude and frequency are each controllable; and
    a vibration data generator configured to generate vibration data for causing vibration of the vibration device whose vibration amplitude and frequency are controllable, based on the received eccentric motor drive data,
    wherein the vibration data generator is configured to generate the vibration data, which indicates a second waveform having an envelope with a change trend that correlates to a change trend of an envelope of a first waveform indicated by vibration of the eccentric motor vibration device according to the eccentric motor drive data, the second waveform having a higher frequency than the first waveform and sampled at a second rate higher than the first rate.

2. The vibration control system according to claim 1, wherein the vibration data generator is configured to:
    calculate an amplitude at a time t based on the eccentric motor drive data,
    normalize the calculated amplitude to a numeric value in a predetermined range, and
    generate the vibration data, which includes the numeric value in the predetermined range and information indicating a vibration frequency.

3. The vibration control system according to claim 1,
    wherein the vibration data includes information indicating an amplitude and information indicating a frequency, and
    the frequency is set to a frequency in the vicinity of a resonance frequency of the vibration device whose vibration amplitude and frequency are controllable.

4. The vibration control system according to claim 3,
    wherein the frequency is a frequency other than the resonance frequency of the vibration device whose vibration amplitude and frequency are controllable, and
    the frequency is set so as to change mainly in a range of 70% to 130% of the resonance frequency.

5. The vibration control system according to claim 1, further comprising
    the eccentric motor vibration device,
    wherein the eccentric motor vibration device is configured to be vibrated based on the eccentric motor drive data.

6. The vibration control system of claim 1 wherein the vibration data generator resamples the received eccentric motor drive data at a different periodicity than the eccentric motor drive data was originally sampled.

7. The vibration control system of claim 1 wherein the vibration data generator receives eccentric motor drive data from the output of an application program.

8. The vibration control system of claim 7 wherein the application program comprises a game program.

9. The vibration control system of claim 1 wherein the vibration data generator comprises at least one processor configured to increase a frequency and generate vibration data in response thereto.

10. The vibration control system of claim 1 wherein the vibration device comprises a linear vibration device.

11. The vibration control system of claim 1 wherein the vibration data generator multiplies the envelope for the eccentric motor vibration device normalized in the amplitude direction by a set amplitude value associated with the vibration device.

12. The vibration control system of claim 1 wherein the vibration data generator matches the second waveform envelope change trend to the change trend of the envelope of the first waveform indicated by vibration of the eccentric motor vibration device vibrated according to the eccentric motor drive data.

13. The vibration control system of claim 1 wherein the change trend indicates amplitude increases and decreases.

14. The vibration control system of claim 1 wherein the vibration data generator generates the vibration data based on a model of the envelope of vibration the eccentric motor vibration device would produce.

15. The vibration control system of claim 1 wherein the system has no eccentric motor vibration device.

16. The vibration control system of claim 1 wherein the vibration data generator generates a vibration waveform having an envelope whose shape is analogous to the envelope of the vibration waveform the eccentric motor vibration device would produce when driven by the eccentric motor drive data.

17. A vibration control method for controlling vibration of a vibration device for which a resonance frequency is higher than suitable for at least one eccentric motor vibration device and whose vibration amplitude and vibration frequency are each controllable, the vibration control method comprising:
    receiving eccentric motor drive data for the eccentric motor vibration device, the received eccentric motor drive data sampled at a first rate;
    changing the sampling rate of the eccentric motor drive data to a second rate higher than the first rate;
    generating, based on the eccentric motor drive data with the changed rate, vibration data indicating a second waveform having an envelope with a change trend that correlates to a change trend of an envelope of a first waveform indicated by vibration of the eccentric motor vibration device according to the eccentric motor drive data, the second waveform having a higher frequency than the first waveform; and
    vibrating the vibration device whose vibration amplitude and vibration frequency are each controllable based on the generated vibration data.

18. A non-transitory storage medium storing therein vibration control program code for controlling vibration of a vibration device for which a resonance frequency is higher than suitable for at least one eccentric motor vibration device and whose vibration amplitude and vibration frequency are each controllable, the vibration control program code when executed causing one or more computer processors to:
    receive eccentric motor drive data sampled at a first rate, for the eccentric motor vibration device;
    produce, from the drive data, drive data sampled at a second rate higher than the first rate;
    generate, based on the produced drive data, vibration data indicating a second waveform having an envelope with a change trend that correlates to a change trend of an envelope of a first waveform indicated by vibration of the eccentric motor vibration device according to the eccentric motor drive data, the second waveform having a higher frequency than the first waveform; and
    vibrate the vibration device whose vibration amplitude and vibration frequency are each controllable based on the generated vibration data.

19. A vibration control system comprising:
one or more processors;
a storage medium storing vibration control program code; and
a vibration device for which a resonance frequency is higher than suitable for at least one eccentric motor vibration device and whose amplitude and frequency are each controllable,
wherein the vibration control program code is configured to perform operations comprising;
receive eccentric motor drive data sampled at a first rate, for the eccentric motor vibration device;
produce, from the received eccentric motor drive data, drive data sampled at a second rate higher than the first rate;
generate vibration data for causing vibration of the vibration device whose amplitude and frequency are each controllable, based on the produced drive data, and
wherein the generated vibration data indicates a second waveform having an envelope with a change trend that correlates to a change trend of an envelope of a first waveform that would be produced by vibrating the eccentric motor vibration device according to the eccentric motor drive data, the second waveform having a higher frequency than the first waveform.

* * * * *